No. 739,182. PATENTED SEPT. 15, 1903.
F. E. IVES.
BINOCULAR MICROSCOPE.
APPLICATION FILED NOV. 8, 1902.
NO MODEL. 2 SHEETS—SHEET 2.
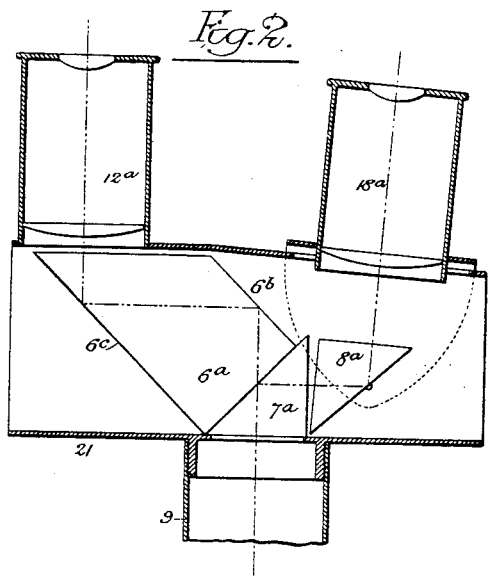
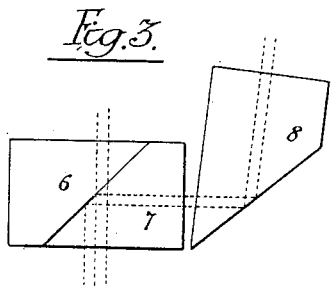
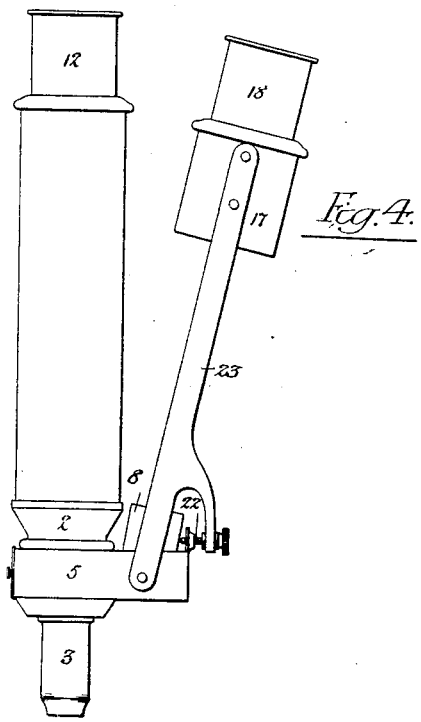
Witnesses:-
Herman E. Metius.
Titus J. Jones.
Inventor:-
Frederic E. Ives,
by his Attorneys
Howson & Howson Patented September 15, 1903.

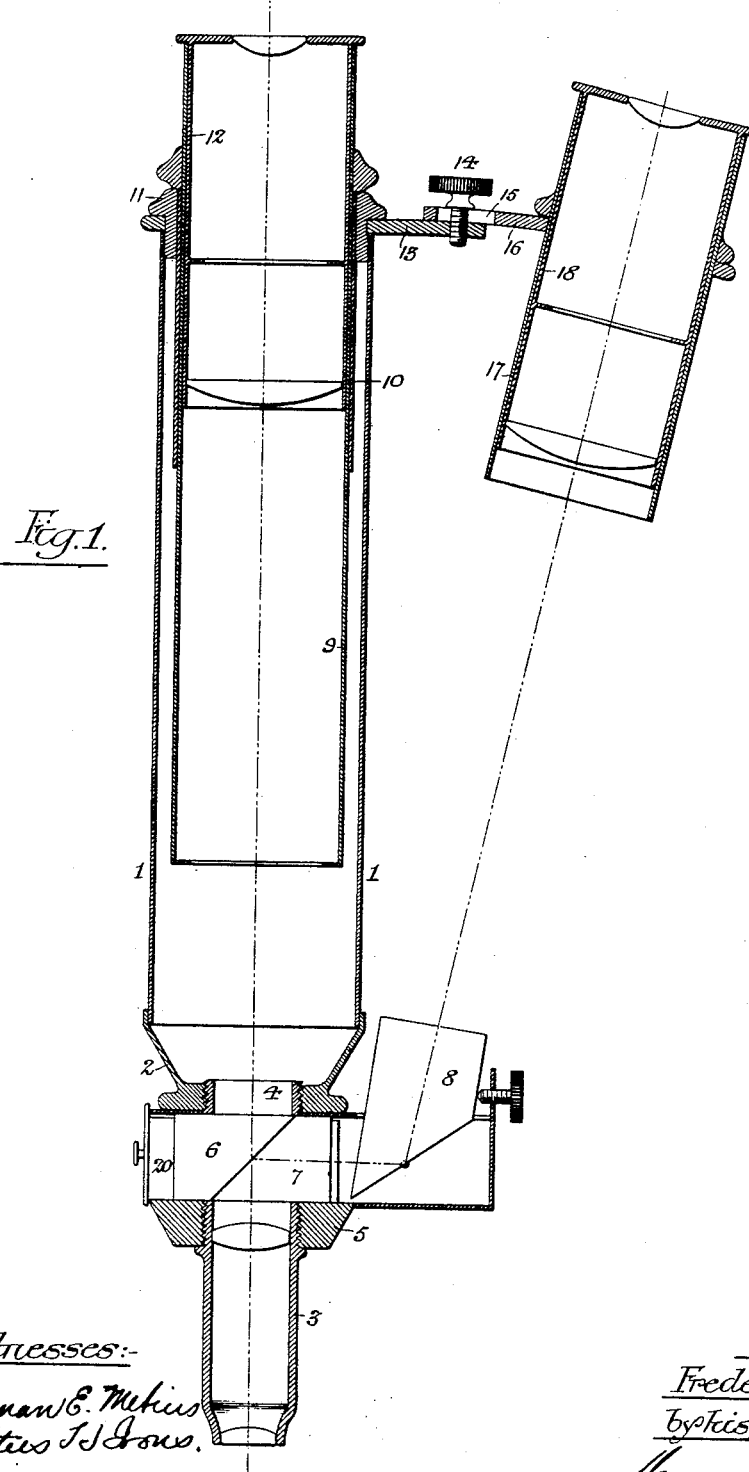

UNITED STATES PATENT OFFICE.

FREDERIC E. IVES, OF PHILADELPHIA, PENNSYLVANIA.

BINOCULAR MICROSCOPE.

SPECIFICATION forming part of Letters Patent No. 739,182, dated September 15, 1903.

Application filed November 8, 1902. Serial No. 130,541. (No model.)

*To all whom it may concern:*

Be it known that I, FREDERIC E. IVES, a citizen of the United States, residing in Philadelphia, Pennsylvania, have invented certain Improvements in Binocular Microscopes, of which the following is a specification.

The object of my invention is to simplify the construction of a binocular microscope and to adapt it to meet a greater variety of requirements than have hitherto been provided for.

In the accompanying drawings, Figure 1 is a vertical sectional view of a binocular microscope constructed in accordance with my invention, and Figs. 2, 3, and 4 are views illustrating other embodiments of the invention or parts of the same.

Referring in the first instance to Fig. 1, which represents an ordinary compound microscope that has been converted into a binocular microscope in accordance with my invention, 1 represents the tube of the microscope, which has at the lower end a cap 2 with threaded opening, into which ordinarily screws the tube 3, carrying the objective lenses. Into this threaded opening in the cap 2 is now screwed a threaded tubular stem 4 upon a box or casing 5, which has a threaded opening for the reception of the tube 3 and is provided with a compound cemented prism 6 7 and a single prism 8, the latter being pivotally mounted within the box 5, so that the angle of its inclined reflecting face can be varied.

The compound cemented prism 6 7 has transparent silvering or platinizing on one of the inner cemented faces, so that a portion of the light-rays will be transmitted through said prism, and a portion will be laterally reflected onto the reflecting-surface of the prism 8 and will thereby be deflected upwardly at an angle dependent upon the angle of said reflecting-surface.

The tube 1 of the microscope has within it a telescopic tube 9, guided within a tube 10, which is carried by a ring 11, screwed into the threaded upper end of the tube 1, and within the telescopic tube 9 is a sliding eyepiece 12, equipped with appropriate lenses.

Between the upper end of the tube 1 and the ring 11 is secured a laterally-projecting plate or bar 13, which carries a clamp-screw 14, the latter having a stem which is adapted to a slot 15 in a plate or bar 16, said bar 16 carrying a tube 17, containing a sliding eyepiece 18, similar to that of the main tube of the microscope, this construction permitting adjustment of the two eyepieces toward and from each other to accord with the pupillary distance of the eyes of the observer or for obtaining stereoscopic or pseudoscopic effects, as hereinafter explained.

The clamp-screw 14 serves to firmly secure the adjustable eyepiece in its desired position of adjustment, and the provision for varying the angle of the prism 8 permits ready adaptation of the latter to any required separation of the two eyepieces.

The prism 8 is extended in the direction of the axial line of the supplementary eyepiece for the purpose of making the optical length of both axial rays alike, so that matched eyepieces can be used and the necessity of using the auxiliary eyepiece of longer focus than that in the main tube is rendered unnecessary.

For convenience I have termed "eyepoints" those points at which are formed the Ramsden circles or eyepiece images of the upper focal plane of the objective.

When the separation of the eyepieces is such that the separation of the two axial rays at the plane of the eye points correspond to the pupillary distance of the observer, the two images appear identical in every respect and the only advantage that binocular vision possesses under these conditions is that it reduces the tendency to fatigue by dividing the work between the two eyes. If, however, the adjustment is such as to bring the axial rays a little closer together than the pupillary distance of the observer, a stereoscopic condition results owing to the inability of one or both eyes under these conditions to receive those pencils of rays which come from the respective sides of the back of the objective, and similarly a greater separation of the axial rays results in a pseudoscopic condition.

In practice it is sufficient to adjust for binocular non-stereoscopic vision with the eyes held at the plane of the eye-points since owing to parallax of axes approaching the eyes to the lenses brings the axial rays within the pupillary distance and withdrawing them above the plane of the eye-points brings the axial rays without the pupillary distance. This is so far true that with low-power eyepieces and objectives all three kinds of vision may be obtained by alterations in the position of the eyes, which are not sufficient to contract the field of vision and uniform illumination.

It is preferable to mount the compound prisms 6 7 within a slide 20, which can be instantly removed, so as to convert the instrument into an ordinary draw-tube monocular microscope with place for inserting a vertical illuminator or other tube accessories.

A special feature of my invention is the construction of the compound prism with metallic reflecting-surface permanently sealed up within it. Similar results have heretofore been obtained only by means of unsilvered prisms having juxtaposed reflecting-surfaces necessarily at a flatter angle to avoid total reflection, thereby objectionably increasing the length of the reflected ray and necessitating extremely accurate work in the polishing of the reflecting-surfaces and in their approximation in such manner as to make the two reflections practically coincident. Another objection to such unsealed compound prisms is the fact that the inclosed surfaces sometimes become so misty as to seriously effect their performance, and the prisms cannot be separated, cleaned, and properly reseated and adjusted except by an expert. They are also incapable of securing approximately equal division of the illumination between the two images, one being always more brilliantly lighted than the other, and owing to the greater length of the reflected ray they do not so readily permit of adaptation to the short-tube construction for which the great majority of microscopic objectives are now adjusted by manufacturers. Inasmuch as the compound prism with transparent silvering is equally efficient at any available point between the objective and the eyepieces some of the merits of my invention may be realized in the form of a binocular eyepiece, such as shown in Fig. 2, in which 21 represents a box or casing applied to the upper end of the tube 9 and having a compound prism 6ª 7ª and an adjustable reflecting-prism 8ª, this box or casing having two projecting eyepieces 12ª and 18ª, the latter being mounted so as to swing upon the same axis as the adjustable prism 8ª.

The meeting surfaces of the prisms 6ª 7ª are provided with a transparent silvered or platinized reflector, and said prism 6ª has two other reflecting-surfaces 6ᵇ and 6ᶜ because of the disposition of the eyepiece 12ª laterally out of line with the main tube 9.

This construction possesses the disadvantage that it increases the optical tube length of the microscope, thereby reducing its efficiency with high-power objectives which have been corrected to perform most perfectly with the shortest tubes; but it might be preferred for use with long-focus objectives on microscopes having limited range of focus between stage and objective screw.

While I prefer the compound prism with transparent silvering on one of the inclosed faces, the construction shown in Fig. 1 also permits of obtaining stereoscopic vision with a compound prism having opaque silvering over half of the inclosed area with perfect transparency of the other half, as shown in Fig. 3. The performance of this combination does not differ materially from that of a Wenham binocular; but it possesses the advantages that it may be adapted to any ordinary monocular microscope and used with the short or continental length of tube.

When it is not desired to effect independent adjustment of the supplementary eyepiece and adjustable reflecting-prism, simultaneous adjustment of the same may be effected—as, for instance, by a device of the character shown in Fig. 4, in which the screw 22, which effects adjustment of the reflecting-prism, has two threaded portions, one engaging with a threaded portion of the box or casing 5 and the other with a threaded projection upon a swinging arm or frame 23, which carries the supplementary eyepiece. This arrangement provides for the necessary differential movement of the prism and eyepiece.

My invention permits parallax vision, which is easier to the eyes than vision with parallel axes, and also permits of the use of any kind of eyepieces in matched pairs.

Having thus described my invention, I claim and desire to secure by Letters Patent—

1. The combination in a binocular microscope, of a pair of separated eyepieces, a compound prism consisting of two cemented prisms, the inclosed face of one of which carries a metallic reflecting-surface, and means whereby the rays divided by said compound prism are directed to the separated eyepieces, substantially as specified.

2. The combination in a binocular microscope, of a pair of separated eyepieces, a compound prism consisting of two cemented prisms, the inclosed face of one of which carries a transparent metallic reflecting-surface, and means whereby the rays divided by said compound prism are directed to the separated eyepieces, substantially as specified.

3. The combination in a binocular microscope, of a compound prism having a transparent metallic reflecting-surface and an adjustable reflector receiving the rays reflected from said surface, substantially as specified.

4. The combination in a binocular microscope, of a main eyepiece, a compound prism having a transparent metallic reflecting-surface, an adjustable reflector receiving the rays reflected from said surface, and a supplementary eyepiece matching the main eyepiece and receiving the rays reflected from the adjustable reflector, said supplementary eyepiece being adjustable from and toward the main eyepiece, substantially as specified.

5. A binocular microscope having a reflecting-prism whose body is extended in the direction of its emergent ray for the purpose of altering the position of the focal plane of a reflected image, substantially as specified.

6. The combination in a binocular microscope, of a compound prism with transparent metallic reflecting-surface and an adjustable reflecting-prism having an extension of its body in the direction of its emergent ray, substantially as specified.

7. The combination in a binocular microscope, of the main tube of the microscope having a projecting plate or bar mounted upon the eyepiece end of the same, a supplementary eyepiece, a carrier therefor, and means for adjustably securing said carrier to the projecting plate or bar of the main tube, substantially as specified.

8. The combination of the main tube of a microscope, with an attachment for binocular vision, said attachment comprising an auxiliary eyepiece at the upper end of the tube, and a prism combination at the lower end of the same, with uninclosed space between the two, substantially as specified.

9. The combination in a binocular microscope, of a pair of separated eyepieces, a compound prism consisting of two cemented prisms inclosing a limited area of metallic reflecting-surface, and means whereby the rays divided by said compound prism are directed to be separated eyepieces, substantially as specified.

10. A binocular microscope-prism consisting of two cemented prisms inclosing a limited area of metallic reflecting-surface, in combination with a reflecting-prism which receives the reflected rays from said compound prism, substantially as specified.

11. The combination of a binocular microscope-prism consisting of two cemented prisms having an inclosed metallic reflecting-surface and adjustable prism receiving the rays reflected from said compound prism and having an extension of its body in the direction of its emergent ray, substantially as specified.

In testimony whereof I have signed my name to this specification in the presence of two subscribing witnesses.

FREDERIC E. IVES.

Witnesses:
   F. E. BECHTOLD,
   JOS. H. KLEIN.